Dec. 2, 1924.
O. W. JOHNSON
1,517,733
SAWING ATTACHMENT FOR TRACTORS
Filed March 16, 1922     3 Sheets-Sheet 1
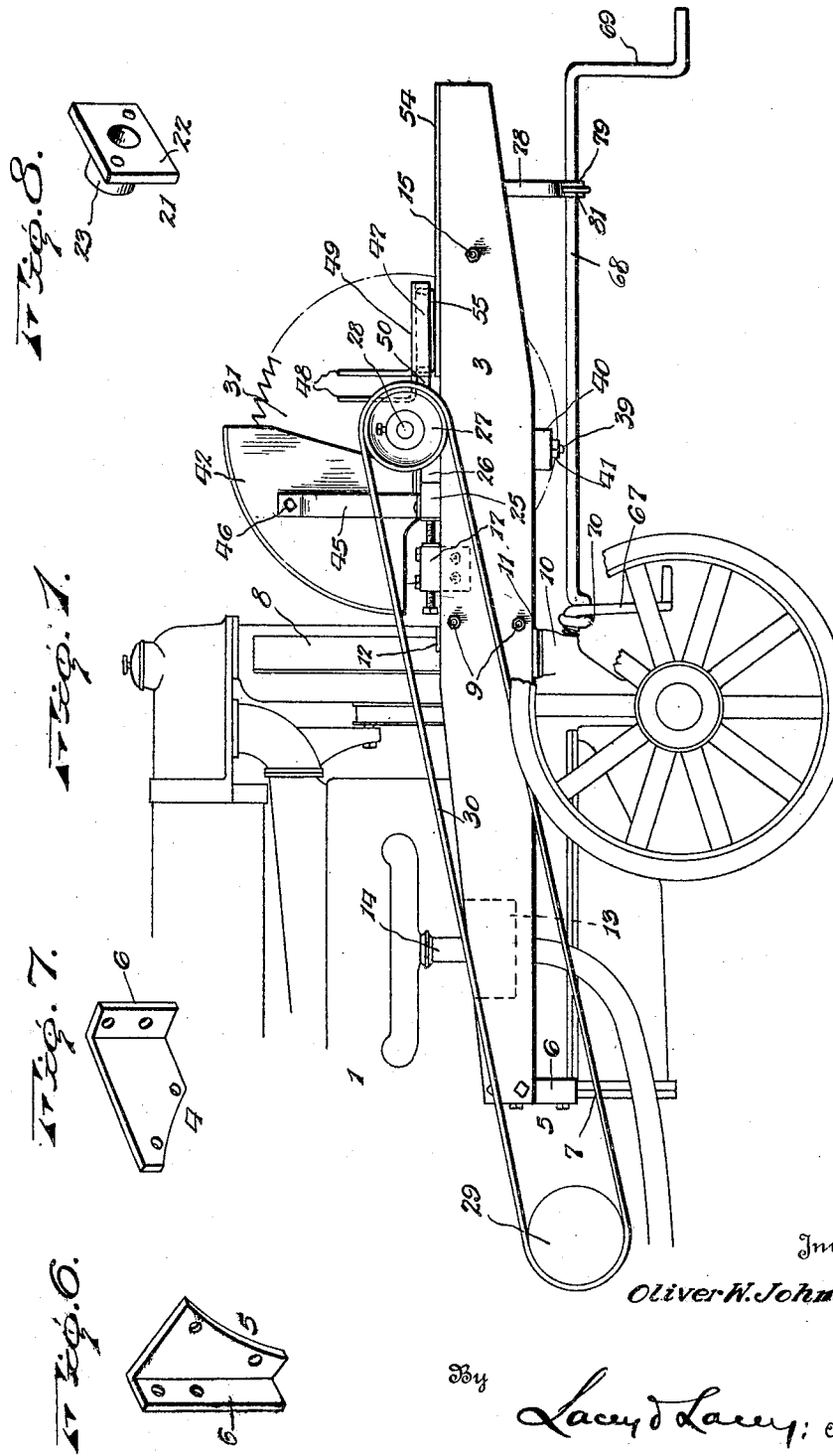
Inventor
Oliver W. Johnson.
By Lacey & Lacey, Attorneys

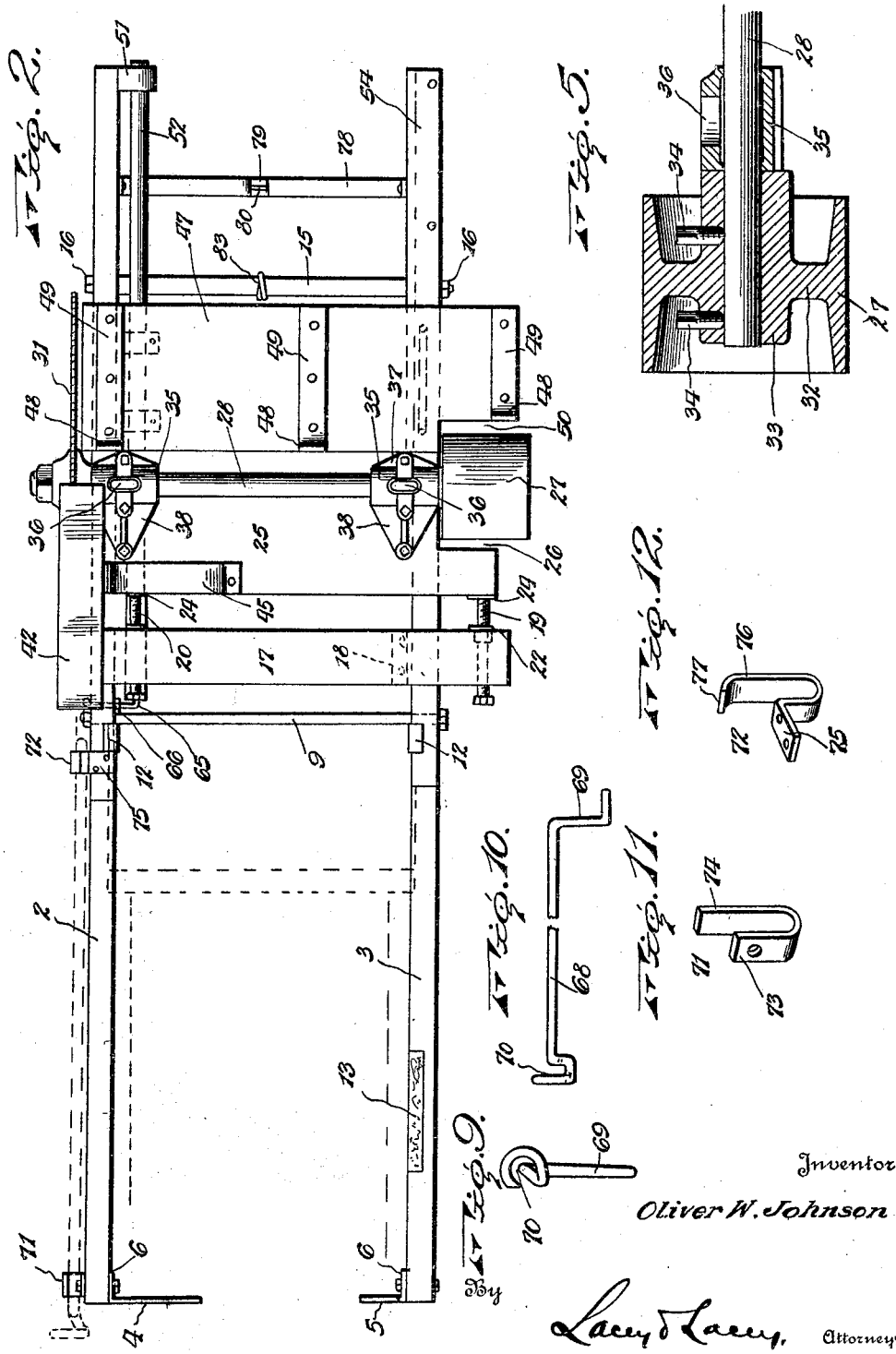

Dec. 2, 1924.
O. W. JOHNSON
1,517,733
SAWING ATTACHMENT FOR TRACTORS
Filed March 16, 1922    3 Sheets-Sheet 3
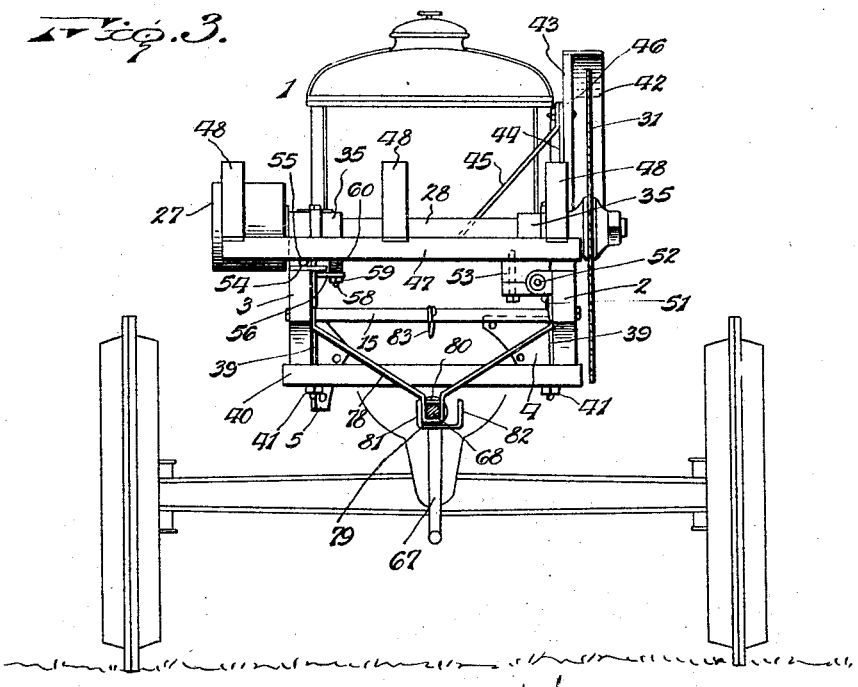
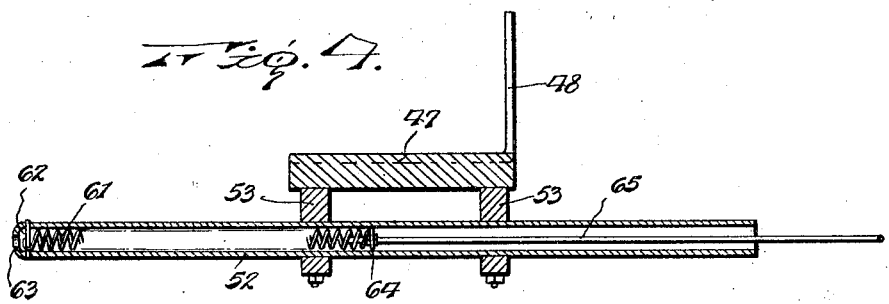
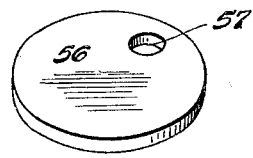
Inventor
Oliver W. Johnson.
By Lacey & Lacey, Attorneys Patented Dec. 2, 1924.

1,517,733

UNITED STATES PATENT OFFICE.

OLIVER W. JOHNSON, OF GENEVA, OHIO.

SAWING ATTACHMENT FOR TRACTORS.

Application filed March 16, 1922. Serial No. 544,222.

*To all whom it may concern:*

Be it known that I, OLIVER W. JOHNSON, a citizen of the United States, residing at Geneva, in the county of Ashtabula and State of Ohio, have invented certain new and useful Improvements in Sawing Attachments for Tractors, of which the following is a specification.

This invention is a sawing attachment for tractors and has for its object the provision of a simple and efficient structure by which the twisting strain imposed upon the device, when it is in use, will be effectually resisted. The invention also seeks to provide a sawing attachment which will be effectual in use without requiring any re-arrangement or any changes in construction of the tractor. Another object of the invention is to provide means whereby the work may be shifted on the work holder without hindrance from or interference with the saw notwithstanding that the tractor may be upon unlevel ground. Other objects of the invention will appear incidentally in the course of the following description.

The invention is illustrated in the accompanying drawings, in which—

Figure 1 is a side elevation of a portion of a tractor having my attachment in position thereon;

Fig. 2 is a plan view of the attachment;

Fig. 3 is a front elevation;

Fig. 4 is an enlarged detail section taken longitudinally of the attachment through the work holder;

Fig. 5 is a detail section through the driving pulley

Figs. 6 and 7 are perspective views of brackets employed to secure the rear end of the attachment to the crank case of the tractor engine;

Fig. 8 is a detail perspective view of a nut employed in the attachment;

Figs. 9 and 10 are detail views of a supplemental starting crank;

Figs. 11 and 12 are detail perspective views of brackets in which the crank may be carried when not in use;

Fig. 13 is a detail perspective view of a keeper employed in the attachment.

In the drawings, the reference numeral 1 indicates a portion of a tractor of a well-known type which is now employed upon farms to a very large extent. In itself, this tractor forms no part of my invention and the illustration thereof is more or less conventional. In carrying out the invention, I employ a pair of side sills 2 and 3 which are disposed at the sides of the crank case of the tractor motor and extend forwardly therefrom past the radiator. To the rear ends of these sills, I secure brackets 4 and 5 respectively, each of which has a base portion 6 which is secured to the inner side of the sill and from which extends a right angular portion having an arcuate edge which is adapted to conform to the surface of the casing of the tractor engine and fit against the flanges 7 thereon. These inwardly projecting portions of the brackets are constructed with bolt holes through which bolts may be passed into the said flanges 7 whereby to rigidly secure the brackets to said flanges. At a point immediately in advance of the radiator, indicated at 8, I insert through the sills clamping bolts or tie rods 9 which are equipped at one end with securing nuts whereby, when said nuts are turned home against the sills, spreading of the sills will be prevented and the sills will be drawn close to the sides of the radiator. The sills are also supported upon the base of the radiator, indicated at 10, and as the base is frequently too narrow to properly support the sills, I provide a bracket or extension plate 11 which is secured to the radiator base and projects laterally therefrom under the bottom of the respective sills so that the sill may rest thereon. I also provide wear plates 12 which are secured to the inner sides of the sills and are adapted to engage against the opposed surfaces of the radiator so that wear upon the wooden sills will be prevented. Of course, if the sills be constructed of metal, these wear plates will be unnecessary and they are not required in every case inasmuch as the sills are supported directly upon the tractor and do not, therefore, partake of the oscillations of the tractor axle. When the attachment is in use, however, there is more or less slight vibration which, if permitted to continue unchecked, will eventually wear into and weaken the sills. I also provide a protective covering 13 of asbestos or other heat-resisting material upon the inner side of the sill 3 which is exposed to the heat from the exhaust manifold, indicated at 14, so that charring of the sill will be prevented.

The sills are further connected near their front ends by a spacing rod or tie bolt 15 which is equipped with securing nuts 16 at its ends and may be shouldered to fit against the inner surfaces of the sills whereby the sills will be held fixedly in parallelism.

At a point slightly in advance of the radiator, I secure upon the sills a bar 17 which may be secured in position by bolts inserted downwardly therethrough into the sills, but will preferably be secured to the sills by angular brackets or attaching plates, indicated at 18, fitted in the angles defined by the bar and the sills and secured to both the bar and the sills. This anchor bar serves as an additional means for preventing spreading of the sills and it is extended laterally beyond the sill 3 and has mounted through its extended end an adjusting screw or bolt 19, a similar bolt or screw 20 being mounted horizontally through the bar near the opposite end thereof. These adjusting screws or bolts are fitted loosely through the anchor bar and are engaged in tubular nuts 21 secured in the bar at the front edge thereof. Each tubular nut comprises a base plate 22 which is secured in place by bolts or screws inserted therethrough into the front edge of the bar, and an internally threaded sleeve 23 which projects rearwardly from the base plate and is received snugly in a socket provided therefor in the anchoring bar. The front ends of the screws 19 and 20 bear against wear plates 24 secured to the rear edge of a mandrel-carrying board or plate 25, the said board or plate being slidably mounted upon the sills so that it may be moved toward the front ends thereof by properly setting the bolts or screws 19 and 20 in an obvious manner. At one end, the plate or board 25 is recessed, as indicated at 26, to accommodate the pulley 27 which is secured upon the end of the saw mandrel 28, and this arrangement brings the said pulley 27 into the same plane with the pulley 29 of the tractor so that the belt 30 trained around the pulleys 27 and 29 will operate in a direct line and the adjacent screw 19 will be disposed to bear upon the mandrel carrier at a point directly back of the pulley and midway the side edges thereof whereby the belt will not be caused to veer to either side and thereby exert a twisting strain upon the mandrel 28. It will be readily understood that adjustment of the bolts or screws 19 and 20 will serve to compensate for stretching of the belt 30 and will also keep the belt and the saw 31 parallel with the sills. Upon reference to Fig. 5 more particularly, it will be noted that the tread or belt-engaging surface of the pulley is expanded laterally beyond both sides of the web 32 connecting the same with the hub 33 of the pulley, and set screws 34 are inserted through the hub to bind upon the mandrel 28 and thereby secure the pulley to the mandrel. This arrangement houses the securing screws between the planes of the sides of the pulley so that they cannot catch in the belt and are not apt to be loosened by chance blows from passing objects. At the same time, they may be easily manipulated by the application of turning tools when removal of the pulley is necessary. The saw mandrel 28 is journaled in boxes 35 upon the plate or board 25 adjacent the front edge thereof and these boxes are provided in their upper sides with lubricant-receiving cavities 36. The front sides of the boxes are provided with short attaching flanges 37, through which suitable bolts are inserted into the mandrel-carrying plate, the said flanges being reduced as much as practicable so as to bring the bearings close to the front edge of the plate or mandrel carrier. Immediately in rear of the bearing portions of the boxes, other bolts are inserted therethrough into the mandrel-carrying plate, and extending from the rear side of the boxes are elongated flanges 38 which rest upon the mandrel carrier and through the extremities of which securing bolts are inserted. Bolts 39 are located immediately adjacent the inner sides of the respective sills and extend through and depend from the mandrel carrier to carry a clamping bar 40, the ends of which bear against the under sides of the sills so that, when nuts 41 on the lower ends of the bolts are turned home, the bar 40 will be securely clamped against the lower edges of the sills and the mandrel carrier, therefore, securely held in its set position. The heads of the bolts 39 are countersunk in the top side of the mandrel-carrier flush therewith under the bearings 35. The clamping bar 40 not only serves as a reinforcement to strengthen the entire structure and impart rigidity thereto but also relieves the torsional strain upon the adjusting screws 19 and 20. The saw 31 is secured to the end of the mandrel remote from the pulley 27 in any convenient or preferred manner, and I also provide a guard 42 which is carried by the mandrel-carrying plate and extends upwardly therefrom in rear of and over the saw so as to prevent sawdust from being drawn into the radiator. This guard may be of any preferred form and is illustrated as comprising a side plate 43 and an arcuate cover plate secured upon the upper edge of the said side plate. The side plate is secured in position upon the mandrel-carrying plate by brackets 44 and 45 which are bolted to the said side plate 43 at their upper ends, as shown at 46, and have their lower ends secured upon the mandrel carrier. The outer bracket 44 is merely a flat-sided standard having a foot at its lower end bearing upon the mandrel carrier and against the plate 43, while the bracket 44 is an inclined brace extending inwardly and downwardly from the said side plate 43 to the mandrel carrier.

In advance of the mandrel carrier, a saw carriage is slidably mounted upon the sills and comprising a board or table 47 transversely overlying the sills having posts or standards 48 at its rear edge. The top of the table is preferably located slightly below the horizontal plane of the saw mandrel 28 as shown in Fig. 1 so that the saw cuts downwardly into the wood and the tendency of the wood to roll from the table upon impact with the saw is thereby counteracted. I have shown this table as projecting past the sill 3 and recessed, as shown at 50, to clear the pulley 27. I have shown a standard 49 at the edge of this recess to guard the limbs or sticks from contact with the pulley despite the fact that this standard is out of line with the standards 48, 48. As a consequence any stick of this length will be cut at a slight angle, but this is no objection as regards firewood and is offset by the ability to use practically the entire radius of the saw. At the extreme front end of the sill 2, I secure a bracket 51 in which is slidably mounted the front end of a tubular guiding member 52, which passes below the table 47 and is secured thereto by clamps 53 the rear end of said tubular guide being supported in a similar bracket secured to the sill at a convenient point below the mandrel carrier. I preferably adjust the position of this guide so as to support the table 47 slightly above the top of the sill 2 to reduce friction and wear; in any case this arrangement prevents side slip or canting of the table and permits free contraction and expansion of the sills as necessitated by their attachment to or detachment from the tractor. Upon the upper side or edge of the sill 3, I secure a wear plate or track 54, the edge of which projects beyond the inner side of the sill and in the under side of the table 47 immediately above the said wear plate, I secure a running iron 55 which bears upon the said plate immediately over the sill, as shown most clearly in Fig. 3, and thereby supports the projecting end of the table upon the sill but out of extended contact therewith so that the frictional wear is minimized. To prevent transverse tilting of the table when the saw is operating, I provide a keeper 56 which may conveniently be a disk of metal provided with an eccentric opening 57 to receive the lower end of a bolt 58 which depends from the table 47. A nut 59 upon the end of this bolt is turned home against the under side of the keeper so as to support the same, and liners or spacers 60 are fitted around the bolt between the keeper and the under side of the table so as to prevent tilting or upward movement of the keeper. When the keepr is in the position illustrated in Fig. 3, it will be engaged under the projecting edge of the wear plate 54 and will thereby resist any tendency of the table top to swing upwardly at that point, but if it be desired to renew the parts or for any other reason to raise the table, the nut 59 may be slightly loosened, whereupon the keeper may be swung pivotally about the supporting bolt so that its projecting eccentric portion will be withdrawn from under the wear plate 54, whereupon the table may be swung pivotally with the tubular guide or runner 52 serving as the pivot member. The member 52 is circular in cross section to permit it to be rotated to equalize the wear. To hold the table in receiving position, especially when the tractor is standing on uneven ground, I have shown a coil spring 61 within the guiding runner 52 having one end attached to a washer or other anchoring member 62, the front end of the guiding runner being bent inwardly, as shown at 63, to prevent the anchoring member passing out therethrough. The rear end of the spring is attached to a plunger head 64 adjustably carried by a plunger rod 65 which projects through the open rear end of the tubular guide member 52 to a point adjacent the tractor where it is bent laterally and bolted to the sill 2. The forward movement of the table is limited by the bracket 51.

Upon reference to Fig. 1, it will be readily noted that the attachment projects an appreciable distance in advance of the tractor and the starting of the tractor engine by the usual crank, indicated at 67, will be exceedingly inconvenient and difficult. I, therefore, provide a supplemental starting crank consisting of a long shank or stem 68 having a handle 69 at its front end and provided at its rear end with an offset or spirally formed open hook 70 so arranged that, if the supplemental crank be supported longitudinally of the attachment and then merely turned in the usual manner of starting an engine, the spirally formed hook will engage around the shank and handle member of the starting crank 67, as shown clearly in Fig. 1, and will impart the necessary rotation thereto. When in use, the shank of the supplemental crank alines with the shank of the usual starting crank, and the hook 70 should be just large enough to receive the shank of the main starting crank and maintain the axial alinement. When this supplemental crank is not in use, it is supported in brackets 71 and 72 secured upon the side of the sill 2. The bracket 71 is a U-shaped metallic strap having its inner attaching member 73 shorter than its outer member 74 so that, when it is engaged by the shank 68 of the supplemental crank, the accidental slipping of the crank from the bracket will be prevented. The bracket 71 is secured directly against the outer side of the sill 2, but the bracket 72 has an attaching plate 75 which is adapted to project over the upper edge of the sill 2 and be secured thereon while the upper end of the outer upstanding member 76 of this bracket is formed into an inwardly projecting overhanging lip 77 which will project over the shank of the supplemental starting crank placed therein and thereby effectually prevent accidental release and loss of the said crank. When the crank is to be used, it is supported in a hanger 78 secured to and extending between the sills and having its intermediate portion converging downwardly from its ends toward its center, as shown most clearly in Fig. 3. At its center, this hanger is constructed with a U-shaped portion 79 which receives the shank of the crank so as to constitute a bearing therefor. Through the sides of this U-shaped bearing portion 79, I insert a keeper pin 80 which is adapted to extend over the shank of the supplemental crank, as shown clearly in Fig. 3, and thereby prevent the crank rising in its bearing. One end of this keeper pin is bent downwardly, as shown at 81, and is then carried transversely under the U-shaped bearing 79 and terminates in an upstanding stop member 82 which, in the position shown in Fig. 3, is spaced from the side of the hanger bearing. When the crank is to be withdrawn, pressure upon the member 82 will effect sliding movement of the keeper pin which will withdraw it from its position over the shank 68 of the supplemental starting crank and permit the withdrawal of the same. The pin cannot, however, be entirely released from the bearing inasmuch as the stop member 82 is so arranged and proportioned that it will come into contact with the adjacent side of the bearing before the end of the pin 80 is free of the opposite side of the bearing, the movement, however, being sufficient to permit the end of the pin to clear the shank of the crank. When the crank is not to be used and is supported in the brackets 71 and 72, the hanger 78 is swung upwardly and rearwardly and one of its side members is engaged by a holder or hook 83 carried by the tie bar 15, being thus supported out of the way of the operator.

From the foregoing description, taken in connection with the accompanying drawings, it will be seen that I have provided an exceedingly simple and efficient attachment for tractors by the use of which pieces of wood may be very rapidly and economically cut into desired lengths. The device is exceedingly useful upon wooded farms inasmuch as the fallen and broken limbs of trees may be cut into small lengths at the place where they fall and it is not necessary to gather them into piles at any particular point on the farm inasmuch as the tractor may be driven to the place where sawing is to be performed and the branches or pieces of wood to be cut then quickly placed upon the table and fed to the saw.

Having thus described the invention, what is claimed as new is:

1. A sawing attachment for self-propelled tractors comprising a pair of sills, means for clamping said sills upon the sides of the tractor engine and radiator, a pair of cross bars located upon the sills in front of said radiator and projecting at one end beyond the adjacent sill, a saw mandrel mounted upon one of said cross bars and projecting beyond both sills, a pulley on the end of said mandrel adjacent the projecting ends of said cross bars, a saw on the opposite end of said mandrel, and a plurality of adjusting screws mounted in one of said cross bars and engaging the other cross bar, one of said screws being in line with said pulley.

2. In a work attachment for gasoline tractors of the type having a lateral work pulley at one side thereof, the combination of a pair of sills projected perpendicularly to said pulley, means for securing said sills to the opposite sides of the tractor, an anchor bar secured upon said sills, a second cross bar mounted slidably upon said sills in front of said anchor bar, an arbor journalled to said second cross bar, a pulley carried by said arbor outside the said sills and in the plane of said work pulley, means for clamping said second bar to said sills, and a plurality of adjusting screws mounted in one of said bars and engaging the other bar whereby said second bar can be moved away from said work pulley, one of said screws being located substantially in the plane of said pulleys.

3. In a sawing attachment for self-propelled tractors, the combination of a pair of sills, a mandrel carrier supported on the sills, a mandrel journaled upon said carrier adjacent the front edge thereof, the ends of the mandrel projecting beyond the ends of the carrier, a saw upon one end of the mandrel, a pulley upon the opposite end of the mandrel, a work-holder slidably mounted upon the sills and having one end recessed to accommodate the pulley whereby the opposite end may move past the saw approximately the full radius thereof, and posts rising from the rear edge of the workholder, one of said posts being located to aline with the pulley.

4. In a sawing attachment for self-propelled tractors, the combination of a pair of sills, a saw mandrel supported on the sills, a pulley upon one end of said mandrel, a saw upon the opposite end of the mandrel, the saw and the pulley being located at the outer sides of the respective sills, a guide runner slidably and rotatably mounted upon the inner side of one sill, a table arranged over the sills and said guide runner, means for clamping said runner to the carriage is slidably mounted upon the sills and comprising a board or table 47 transversely overlying the sills having posts or standards 48 at its rear edge. The top of the table is preferably located slightly below the horizontal plane of the saw mandrel 28 as shown in Fig. 1 so that the saw cuts downwardly into the wood and the tendency of the wood to roll from the table upon impact with the saw is thereby counteracted. I have shown this table as projecting past the sill 3 and recessed, as shown at 50, to clear the pulley 27. I have shown a standard 49 at the edge of this recess to guard the limbs or sticks from contact with the pulley despite the fact that this standard is out of line with the standards 48, 48. As a consequence any stick of this length will be cut at a slight angle, but this is no objection as regards firewood and is offset by the ability to use practically the entire radius of the saw. At the extreme front end of the sill 2, I secure a bracket 51 in which is slidably mounted the front end of a tubular guiding member 52, which passes below the table 47 and is secured thereto by clamps 53 the rear end of said tubular guide being supported in a similar bracket secured to the sill at a convenient point below the mandrel carrier. I preferably adjust the position of this guide so as to support the table 47 slightly above the top of the sill 2 to reduce friction and wear; in any case this arrangement prevents side slip or canting of the table and permits free contraction and expansion of the sills as necessitated by their attachment to or detachment from the tractor. Upon the upper side or edge of the sill 3, I secure a wear plate or track 54, the edge of which projects beyond the inner side of the sill and in the under side of the table 47 immediately above the said wear plate, I secure a running iron 55 which bears upon the said plate immediately over the sill, as shown most clearly in Fig. 3, and thereby supports the projecting end of the table upon the sill but out of extended contact therewith so that the frictional wear is minimized. To prevent transverse tilting of the table when the saw is operating, I provide a keeper 56 which may conveniently be a disk of metal provided with an eccentric opening 57 to receive the lower end of a bolt 58 which depends from the table 47. A nut 59 upon the end of this bolt is turned home against the under side of the keeper so as to support the same, and liners or spacers 60 are fitted around the bolt between the keeper and the under side of the table so as to prevent tilting or upward movement of the keeper. When the keepr is in the position illustrated in Fig. 3, it will be engaged under the projecting edge of the wear plate 54 and will thereby resist any tendency of the table top to swing upwardly at that point, but if it be desired to renew the parts or for any other reason to raise the table, the nut 59 may be slightly loosened, whereupon the keeper may be swung pivotally about the supporting bolt so that its projecting eccentric portion will be withdrawn from under the wear plate 54, whereupon the table may be swung pivotally with the tubular guide or runner 52 serving as the pivot member. The member 52 is circular in cross section to permit it to be rotated to equalize the wear. To hold the table in receiving position, especially when the tractor is standing on uneven ground, I have shown a coil spring 61 within the guiding runner 52 having one end attached to a washer or other anchoring member 62, the front end of the guiding runner being bent inwardly, as shown at 63, to prevent the anchoring member passing out therethrough. The rear end of the spring is attached to a plunger head 64 adjustably carried by a plunger rod 65 which projects through the open rear end of the tubular guide member 52 to a point adjacent the tractor where it is bent laterally and bolted to the sill 2. The forward movement of the table is limited by the bracket 51.

Upon reference to Fig. 1, it will be readily noted that the attachment projects an appreciable distance in advance of the tractor and the starting of the tractor engine by the usual crank, indicated at 67, will be exceedingly inconvenient and difficult. I, therefore, provide a supplemental starting crank consisting of a long shank or stem 68 having a handle 69 at its front end and provided at its rear end with an offset or spirally formed open hook 70 so arranged that, if the supplemental crank be supported longitudinally of the attachment and then merely turned in the usual manner of starting an engine, the spirally formed hook will engage around the shank and handle member of the starting crank 67, as shown clearly in Fig. 1, and will impart the necessary rotation thereto. When in use, the shank of the supplemental crank alines with the shank of the usual starting crank, and the hook 70 should be just large enough to receive the shank of the main starting crank and maintain the axial alinement. When this supplemental crank is not in use, it is supported in brackets 71 and 72 secured upon the side of the sill 2. The bracket 71 is a U-shaped metallic strap having its inner attaching member 73 shorter than its outer member 74 so that, when it is engaged by the shank 68 of the supplemental crank, the accidental slipping of the crank from the bracket will be prevented. The bracket 71 is secured directly against the outer side of the sill 2, but the bracket 72 has an attaching plate 75 which is adapted to project over the upper edge of the sill 2 and be secured thereon while the upper end of the outer upstanding member 76 of this bracket is formed into an inwardly projecting overhanging lip 77 which will project over the shank of the supplemental starting crank placed therein and thereby effectually prevent accidental release and loss of the said crank. When the crank is to be used, it is supported in a hanger 78 secured to and extending between the sills and having its intermediate portion converging downwardly from its ends toward its center, as shown most clearly in Fig. 3. At its center, this hanger is constructed with a U-shaped portion 79 which receives the shank of the crank so as to constitute a bearing therefor. Through the sides of this U-shaped bearing portion 79, I insert a keeper pin 80 which is adapted to extend over the shank of the supplemental crank, as shown clearly in Fig. 3, and thereby prevent the crank rising in its bearing. One end of this keeper pin is bent downwardly, as shown at 81, and is then carried transversely under the U-shaped bearing 79 and terminates in an upstanding stop member 82 which, in the position shown in Fig. 3, is spaced from the side of the hanger bearing. When the crank is to be withdrawn, pressure upon the member 82 will effect sliding movement of the keeper pin which will withdraw it from its position over the shank 68 of the supplemental starting crank and permit the withdrawal of the same. The pin cannot, however, be entirely released from the bearing inasmuch as the stop member 82 is so arranged and proportioned that it will come into contact with the adjacent side of the bearing before the end of the pin 80 is free of the opposite side of the bearing, the movement, however, being sufficient to permit the end of the pin to clear the shank of the crank. When the crank is not to be used and is supported in the brackets 71 and 72, the hanger 78 is swung upwardly and rearwardly and one of its side members is engaged by a holder or hook 83 carried by the tie bar 15, being thus supported out of the way of the operator.

From the foregoing description, taken in connection with the accompanying drawings, it will be seen that I have provided an exceedingly simple and efficient attachment for tractors by the use of which pieces of wood may be very rapidly and economically cut into desired lengths. The device is exceedingly useful upon wooded farms inasmuch as the fallen and broken limbs of trees may be cut into small lengths at the place where they fall and it is not necessary to gather them into piles at any particular point on the farm inasmuch as the tractor may be driven to the place where sawing is to be performed and the branches or pieces of wood to be cut then quickly placed upon the table and fed to the saw.

Having thus described the invention, what is claimed as new is:

1. A sawing attachment for self-propelled tractors comprising a pair of sills, means for clamping said sills upon the sides of the tractor engine and radiator, a pair of cross bars located upon the sills in front of said radiator and projecting at one end beyond the adjacent sill, a saw mandrel mounted upon one of said cross bars and projecting beyond both sills, a pulley on the end of said mandrel adjacent the projecting ends of said cross bars, a saw on the opposite end of said mandrel, and a plurality of adjusting screws mounted in one of said cross bars and engaging the other cross bar, one of said screws being in line with said pulley.

2. In a work attachment for gasoline tractors of the type having a lateral work pulley at one side thereof, the combination of a pair of sills projected perpendicularly to said pulley, means for securing said sills to the opposite sides of the tractor, an anchor bar secured upon said sills, a second cross bar mounted slidably upon said sills in front of said anchor bar, an arbor journalled to said second cross bar, a pulley carried by said arbor outside the said sills and in the plane of said work pulley, means for clamping said second bar to said sills, and a plurality of adjusting screws mounted in one of said bars and engaging the other bar whereby said second bar can be moved away from said work pulley, one of said screws being located substantially in the plane of said pulleys.

3. In a sawing attachment for self-propelled tractors, the combination of a pair of sills, a mandrel carrier supported on the sills, a mandrel journaled upon said carrier adjacent the front edge thereof, the ends of the mandrel projecting beyond the ends of the carrier, a saw upon one end of the mandrel, a pulley upon the opposite end of the mandrel, a work-holder slidably mounted upon the sills and having one end recessed to accommodate the pulley whereby the opposite end may move past the saw approximately the full radius thereof, and posts rising from the rear edge of the workholder, one of said posts being located to aline with the pulley.

4. In a sawing attachment for self-propelled tractors, the combination of a pair of sills, a saw mandrel supported on the sills, a pulley upon one end of said mandrel, a saw upon the opposite end of the mandrel, the saw and the pulley being located at the outer sides of the respective sills, a guide runner slidably and rotatably mounted upon the inner side of one sill, a table arranged over the sills and said guide runner, means for clamping said runner to the under side of said table at one end of the table, and means for normally preventing vertical movement of the opposite end of the table relative to the sills.

5. In a sawing attachment for self-propelled tractors, the combination of a pair of sills, a saw mandrel supported on the sills, a saw at one end of the mandrel, a pulley at the opposite end of the mandrel, a guide runner slidably and rotatably mounted upon the inner side of the sill adjacent the saw, a table secured to said runner and projecting over the other sill, a wear plate secured upon the last-mentioned sill and projecting beyond the inner side thereof, a runner member on the under side of the table riding upon said wear plate, and a keeper carried by the under side of the table and projecting under the edge of said wear plate.

6. In a sawing attachment for tractors, the combination of a pair of sills, a saw mandrel supported on the sills, a saw at one end of the mandrel, a pulley at the opposite end of the mandrel, a guide runner slidably and rotatably mounted upon the inner side of the sill adjacent the saw, a table secured to said runner to project over the other sill, a wear plate secured upon the last-mentioned sill to project beyond the inner side thereof, a runner member on the under side of the table riding upon said wear plate, a hanger depending from the table adjacent the wear plate and the runner member, a keeper disk mounted eccentrically on said hanger and adapted in one position to engage under the projecting edge of the wear plate, and means for retaining the keeper disk on the hanger.

7. In a sawing attachment for tractors, the combination of a pair of sills, a saw supported on the sills, means for driving said saw from the tractor, a tubular guide runner slidably mounted upon one of the sills, a work-holding table disposed over the sills and secured to said guide runner, an anchor member in the front end of the guide runner, a plunger rod fixed to the adjacent sill and extending into the guide runner through the rear end of the same, a plunger head on said rod within the guide runner, and an elastic member having its rear end secured to said head and its front end secured to the anchoring member in the guide runner.

8. In a sewing attachment for tractors, the combination with a pair of longitudinal sills, and means for securing said sills to a tractor at one end, said sills having a limited amount of to and fro movement at that end whereby they may be applied to and removed from a tractor, a rigid member carried by said sills, a saw arbor journaled to said rigid member, and a saw table movable along said sills to and from the saw, said table having a guiding connection with one of said sills and sliding engagement with the other sill.

9. In a sawing attachment for tractors, the combination with a pair of longitudinal sills and cross members connecting said sills, said sills projecting beyond said cross members at one end, of means for securing said projecting ends to the front part of a tractor, means cooperating with said first means to support said sills substantially horizontal during operation of said attachment, a saw arbor journaled transversely of said sills close to the upper surfaces thereof and adjacent to one of said cross members, a saw table mounted above said sills at the opposite side of said arbor from said projecting ends and movable toward and away from the saw, supporting means for said table carried by said sills at a point below their upper surfaces, and means depending from said table and operatively engaging said supporting means, said table moving freely over the top of at least one of said sills and out of contact therewith.

In testimony whereof I affix my signature.

OLIVER W. JOHNSON.